(12) United States Patent
Colonna

(10) Patent No.: US 8,265,677 B2
(45) Date of Patent: Sep. 11, 2012

(54) METHOD FOR THE OPTIMIZATION OF CHANNEL SCANNING FUNCTION IN A TELECOMMUNICATION NETWORK FOR MOBILE TERMINALS

(75) Inventor: Massimo Colonna, Turin (IT)

(73) Assignee: Telecom Italia S.p.A., Milan (IT)

( * ) Notice: Subject to any disclaimer, the term of this patent is extended or adjusted under 35 U.S.C. 154(b) by 829 days.

(21) Appl. No.: 11/919,910

(22) PCT Filed: May 4, 2005

(86) PCT No.: PCT/IB2005/001211
§ 371 (c)(1),
(2), (4) Date: Jan. 5, 2009

(87) PCT Pub. No.: WO2006/117587
PCT Pub. Date: Nov. 9, 2006

(65) Prior Publication Data
US 2009/0253392 A1    Oct. 8, 2009

(51) Int. Cl.
*H04B 15/00* (2006.01)
(52) U.S. Cl. .......... 455/513; 455/435.1; 455/435.2; 455/435.3; 455/452.2; 455/455; 455/464; 455/509; 455/512; 455/343.2; 455/343.3; 455/343.4
(58) Field of Classification Search .......... 455/513, 455/435.1, 435.2, 435.3, 452.2, 455, 464, 455/509, 512, 343.2, 343.3, 343.4
See application file for complete search history.

(56) References Cited

U.S. PATENT DOCUMENTS

| | | | |
|---|---|---|---|
| 6,263,208 B1 | 7/2001 | Chang et al. | |
| 6,393,294 B1 * | 5/2002 | Perez-Breva et al. | 455/456.5 |
| 6,529,164 B1 | 3/2003 | Carter | |
| 2002/0137466 A1 * | 9/2002 | Bamburak et al. | 455/62 |
| 2003/0134658 A1 | 7/2003 | Kaminski et al. | |
| 2004/0137908 A1 | 7/2004 | Sinivaara et al. | |
| 2004/0152480 A1 * | 8/2004 | Willars et al. | 455/513 |
| 2004/0224690 A1 | 11/2004 | Choi et al. | |

(Continued)

FOREIGN PATENT DOCUMENTS
WO    WO 00/50918 A2    8/2000
(Continued)

OTHER PUBLICATIONS

Rappaport; "Mobile Radio Propagation: Large-Scale Path Loss", Wireless Communications, Principles and Practice, Prentice Hall PTR, New Jersey, Chapter 3, pp. 70-73 and 122-133, (1996).

(Continued)

*Primary Examiner* — Kwasi Karikari
(74) *Attorney, Agent, or Firm* — Finnegan, Henderson, Farabow, Garrett & Dunner, L.L.P.

(57) ABSTRACT

A telecommunications network for mobile terminals, in particular a wireless LAN network, includes a plurality of network access points defining a network coverage area and each one associated with a respective transmission channel; at least one mobile terminal adapted to move inside the coverage area and configured for performing a transmission channels scanning; a terminal locating server, configured for determining a position in which the terminal must perform the scanning, for determining a set of channels adapted to be received in the position with predetermined transmission characteristics, and for communicating such set of channels to the mobile terminal, so that the scanning, for example, for tracking or handover purposes, can be performed on a limited number of channels, thereby increasing the useful time for providing telecommunication services.

18 Claims, 8 Drawing Sheets

U.S. PATENT DOCUMENTS

| | | | |
|---|---|---|---|
| 2005/0066373 A1 | 3/2005 | Rabinowitz et al. | |
| 2006/0146834 A1* | 7/2006 | Baker et al. | 370/395.53 |
| 2006/0211421 A1* | 9/2006 | Vuong et al. | 455/434 |

FOREIGN PATENT DOCUMENTS

| | | |
|---|---|---|
| WO | WO 02/054813 A1 | 7/2002 |
| WO | WO 03/101140 A1 | 12/2003 |

OTHER PUBLICATIONS

Girardi et al.;"Turin, Italy—Hollywood, California: A Virtual Connection", Global Communications Newsletter, IEEE Communications Magazine, vol. 41, No. 8, (2003).

IEEE Wireless LAN Edition, "A Compilation Based on IEEE Std 802.11-1999, (R2003), and Its Amendments", Standard Information Network, IEEE Press, pp. i-xx, 118-120 and 143-145, (2003).

* cited by examiner

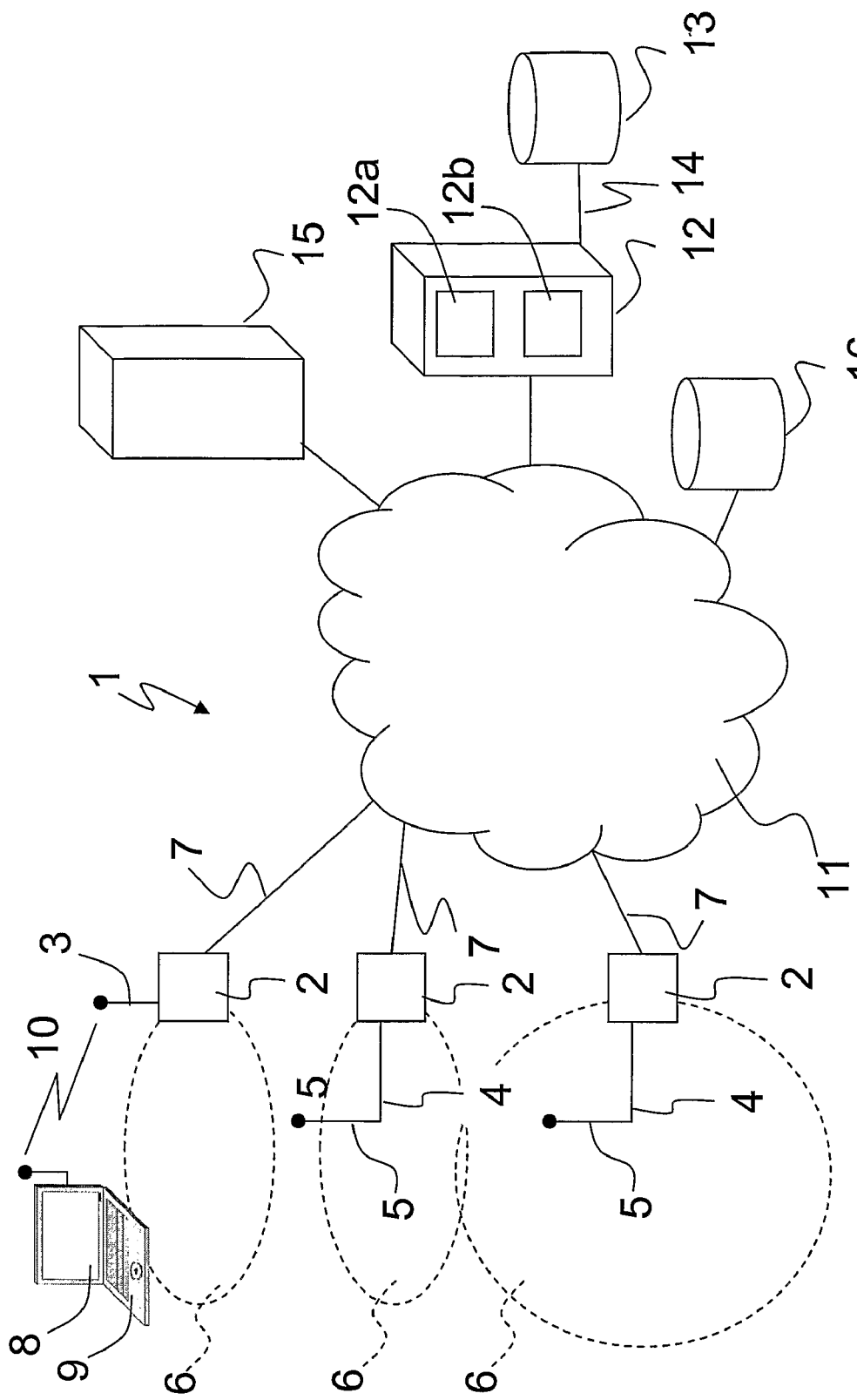

METHOD FOR THE OPTIMIZATION OF CHANNEL SCANNING FUNCTION IN A TELECOMMUNICATION NETWORK FOR MOBILE TERMINALS

CROSS REFERENCE TO RELATED APPLICATION

This application is a national phase application based on PCT/IB2005/001211, filed May 4, 2005, the content of which is incorporated herein by reference.

FIELD OF THE INVENTION

The present invention relates to a method for optimising the channel scanning function in a telecommunications network for mobile terminals, in particular in a wireless local telecommunications network, namely a network free from cable connections with terminals. More in detail, the present invention refers to a method for optimising the transmission channels scanning performed by a mobile terminal in order to measure a parameter of interest, for example the received power, on network transmission channels, to be used for locating the terminal itself.

DESCRIPTION OF THE RELATED ART

A wireless local telecommunications network, or more briefly a WLAN (Wireless Local Area Network), typically comprises a set of Access Points, arranged on a determined area to perform its cellular coverage. The Access Points are connected to a wired network through which they can exploit one or more services made available by the network. Every user is equipped with a terminal, for example a portable PC or a Personal Digital Assistant (PDA), through which he can use the different services that the network makes available for him. Communications between terminals and WLAN network occur through a WLAN apparatus, integrated or not in the terminal, such as for example a card of the PCMCIA (Personal Computer Memory Card International Association) type or an adapter of the PCI (Peripheral Component Interconnect) type, and the used protocol can be standardised, such as for example the IEEE 802.11 protocol in its different version or the HIPERLAN protocol, or a proprietor protocol.

Some particularly interesting applications for WLAN networks are based on terminal location in a determined area, for example those applications that allow a Service Provider to provide a user with specific contents depending on the geographic position in which the user itself can be found. The realisation of such applications requires the use of a suitable locating system, namely a system that is able to determine the user position depending on measures of power, delay or any other radio-electric or performance parameter, carried out by the user terminal and transmitted from this latter one to the system.

Among the locating systems, of particular importance are the tracking systems, namely those systems that continuously determine at regular intervals the user position. Such systems can enable a series of services, among which, for example, the one described in article "Turin, Italy—Hollywood, Calif.: A Virtual Connection" published on IEEE Communications Magazine, Vol. 41, No. 8, August 2003. The service described in such document consists in a multimedia tour that allows a user of a museum equipped with a PDA to receive specific audio and video contents for the position in which he currently is. Such service is enabled by a tracking system, comprising a server connected to the network and equipped with a suitable algorithm that locates at regular intervals the user allowing an automatic update of audio, video and text contents provided thereto. Similar applications can naturally be developed in contexts of a different type, such as for example exhibitions.

The locating systems, particularly the tracking ones, are based on the terminal capability of performing the scanning of the several radio channels on which the WLAN network Access Points can operate in order to measure a parameter of interest, for example the received power, on signals transmitted by the Access Points. Such measures are sent every time to the tracking server, that is thereby able to determine the terminal position.

The need of performing the channel scanning can also be had for functionalities that are different from tracking, for example for executing the so-called handover procedure. This latter one is the procedure that allows a terminal to exchange the Access Point through which it accesses the network and is used by the terminal when the current Access Point is not able any more to guarantee the desired communications quality. In this case, in order to locate the new Access Point through which the network is accessed, the terminal must first of all perform the scanning of all available channels, measure the signal on different channels, choose among all detected Access Points the one from which a signal is received that satisfies the terminal requirements and finally start communications with this Access Point.

Standard IEEE 802.11, in document "IEEE Standard for Information technology—Telecommunications and information exchange between systems—Local and metropolitan area networks—Specific requirements—Part 11: Wireless LAN Medium Access Control (MAC) and Physical Layer (PHY) Specifications", pages 143-145 and 118-120, describes two different scanning modes: active scanning and passive scanning.

In active scanning, on every channel available in the used transmission band, the terminal sends a frame called Probe Request and all Access Points that receive it reply with a frame called Probe Response. The Probe Response frame is used by the terminal for performing the measure of the radio-electric parameter of interest, that in general is the reception power. Upon the elapse of a predefined time interval, the terminal changes channel repeating the described procedure on the new channel.

In passive scanning, instead, on every available channel the terminal remains listening for a predefined time waiting to receive a particular frame called Beacon that is periodically transmitted (typically every 100 ms) by the Access Points and on which the terminal performs the measure of the radioelectric parameter of interest.

A similar procedure to the passive scanning is performed by WLAN systems with HIPERLAN (High PErformance Radio Local Area Network) standard developed by the European Telecommunications Standards Institute. The terminals complying with this standard perform the measure of the radio-electric parameter of interest on the Broadcast Channel, BCH, of the radio frame.

During the scanning procedure (both active and passive one) a terminal is compelled to leave the channel on which it is communicating and therefore is not able, for the whole length of a scanning, to transmit and receive information. The Applicant has observed that such reduction of the useful communication time can be relevant. As an example, taking into account a passive scanning, a typical transmission period of the Beacon frame equal to 0.1 s and a number of available channels on which scanning has to be performed equal to 13 (like those available in Europe in the ISM band at 2.4 GHz), the scanning length is equal to 1.3 seconds. With such scanning length, if an application is taken into account, always as an example, based on tracking of the terminal that requires the measures execution every 5 seconds, there is a percentage reduction of the useful connection length equal to about 26% and a consequent reduction, always by 26%, of the connection throughput, namely of the average traffic that reaches its destination in time. Such problem is still more evident when there is a tracking system that requires the terminal to perform the scanning with a greater frequency, making thereby more difficult to provide a user with multimedia and wide band contents.

Also the scanning during handover, even if lower given the lower frequency with which it occurs, has negative effects on services. The communication interruption consistence is such as to be negatively perceived by users and can cause a communications drop.

The Applicant has also observed that, since a WLAN network is not realised by using all available frequencies, due to interferences that would be created among different cells, part of the time spent for scanning appears useless since on some channels the terminal does not detect the presence of any Access Point.

Moreover, in addition to reducing the useful communication time, the scanning procedure implies a power consumption by the terminal that affects the battery charge time.

Patent application US 2003/0134658, related to a method for communicating messages in a WLAN network, describes a method for optimising the scanning of a WLAN terminal making the interval between two consecutive scannings independent from the terminal rate (the lower the terminal rate, the lower the frequency with which a scanning is performed) or the amount of data to be received or transmitted (the higher the amount of data, the lower the frequency with which the scanning is performed). The Applicant observes that, in general, such method can produce good results in case of a terminal that is able to autonomously decide the scanning rate, while it is not suitable when there are services like the previously mentioned ones, in which the scanning rate is determined by applications and tracking server. In any case, the described method provides for performing the scanning on all available channels, anyway generating a capacity waste.

Patent application US 2004/0137908 describes a method for selecting an Access Point in a WLAN network (in particular a standard IEEE 802.11) both in a network terminal input and during roaming operations. In such patent application, a technique is disclosed for performing the scanning that allows reducing the number of channels on which the scanning itself is performed. According to such technique, each Access Point stores the frequencies used by adjacent Access Points and transmits such information inside the Beacon and Probe Response frames, thereby allowing the terminals to perform the scanning only on pointed-but channels, or even on a subset of them established by the terminal itself. The Applicant observes that such arrangement has the disadvantage of requiring functionalities that are not foreseen by the IEEE standard and therefore it cannot be used in current WLAN networks. The arrangement cannot further be applied to apparatuses complying with other standards (for example those with HIPERLAN, WiMAX standards, etc.) since it does not take into account the different frame structures provided by them. Moreover, performing the scanning only on channels of adjacent Access Points limits the number of Access Points on which the terminal can measure the received power, with negative effects on location accuracy; this because, due to the characteristics of the environment in which propagation occurs, it is possible that signals transmitted by adjacent Access Points are not visible by the terminal (for example because separated therefrom by strongly attenuating obstacles) and that instead signals transmitted by non-adjacent Access Points, that therefore would not be detected, are visible.

Patent application US 2004/0224690 is related to a method that allows reducing the length of a handoff (or a handover). When the terminal realises the need of performing an handoff, it sends a Handoff Alert message to the Access Point to which it is connected; this latter one replies with an Acknowledgement message that contains, among the others, identifiers of other network Access Points and channels used by them (the Access Point obtains these information by simply querying all network Access Point through a suitable message). Now the terminal can perform the scanning only on those channels pointed out in this message. The Applicant deems that this technique does not optimise the scanning, since it is performed also on Access Points channels that cannot be received by a user, since placed at long distances or since separated therefrom by strongly attenuating obstacles.

SUMMARY OF THE INVENTION

The Applicant therefore has observed that the prior art techniques do not efficiently solve the previously-described problems, like reduction of useful connection time and power consumption due to scanning. The Applicant has therefore taken into account the problem of providing a technique that allows optimising the above scanning operation, being either active or passive, and that can be advantageously used for tracking and/or for handover operations, independently from the technology with which the radio network is made.

The present invention therefore relates to a method that, used in a local wireless telecommunications network, namely free from cable connections, allows optimising the network scanning by the terminal in order to improve the connection throughput (namely the useful connection time) between Access Points and terminal itself.

The Applicant has found that, by locating and signalling to the terminal the channels that can be received in the geographic position where the terminal must perform the scanning, it is possible to optimise the scanning operation. The position in which the terminal must perform the scanning can be the current terminal position or its future position. In case of the current terminal position, determining the position can be made with suitable location techniques, or estimated depending on previous measured positions, while in case of a future position, determining the position can only be estimated.

In case of terminal tracking, in which the scanning is typically performed periodically, the position in which the terminal must perform the scanning is, according to the method of the present invention, a future terminal position. In particular, the tracking server, after having received radio-electric measures from the terminal in its current position and after having determined the current terminal position depending on such measures, computes the position in which the terminal will be when it will have to perform the scanning again, determines which are the Access Points that the terminal will be able to receive in the thereby-computed position, locates the channels on which these Access Points operate and communicates this set of channels to the terminal, which can then perform the following scanning only on them. These operations are cyclically repeated for the whole service length.

Alternatively, the tracking server can verify whether the individual channels are different from those of the previous cycle and communicate them to the terminal only in case of an affirmative reply. The terminal, if it does not receive any message from the server, performs the scanning on the same channels of the previous cycle.

With respect to optimising the handover procedure, the tracking server, after having received the handover request by the terminal, determines the position in which the terminal was when it transmitted the request, determines which are the Access Points that the terminal is able to receive in the thereby-computed position, locates the channels on which these Access Points operate and communicate this set of channels to the terminal which can perform the scanning only on them. These operations are repeated upon every handover. Determining the terminal position upon the request can for example be based on the latest radio-electric measures received by the terminal for tracking purposes.

Also in this case, the tracking server can verify whether the individual channels are different from those of the previous handover, and, only in case of an affirmative reply, communicate them to the terminal. This latter one, if it does not receive any message from the server, performs the scanning on the same channels of the previous handover.

Alternatively, the terminal can communicate the server the need of having to perform a handover, not immediately but after t seconds. Now the server estimates the terminal position in the future instant in which it will have to perform the handover, obtains which are the Access Points that the terminal will be able to receive in such position and locates the channels on which these Access Points operate. The server communicates then this set of channels to the terminal. Also in this case, determining the future terminal position can be based on the latest radio-electric measures received by the terminal for tracking purposes.

Moreover, both in case of tracking scanning and in case of handover tracking, the server can communicate to the terminal in addition to the channels, also the Access Points identifiers being present on such channels. In such case, the terminal, when performing the scanning, instead of stopping on any channel for the maximum time fixed by the standard, is able to stop exclusively for the necessary time to measure the power on signals transmitted by Access Points signalled by the server, thereby further reducing the scanning length.

According to a first aspect thereof, the present invention is therefore related to a method for optimising the scanning of radio channels by a mobile terminal in a telecommunications network, comprising the steps of:
a) determining, within a network coverage area, a scanning position in which the terminal must perform the scanning of radio channels;
b) determining a set of radio channels received in the scanning position with pre-established reception characteristics; and
c) performing, in the scanning position, only the scanning of such set of channels.

In the tracking procedure, steps a), b) and c) are cyclically repeated; in the handover procedure, steps a), b) and c) are performed following a request by the terminal.

Advantageously, the step of performing the scanning comprises the step of performing on each channel of said set the measure of at least one radio-electric parameter, preferably the received power. The above pre-established reception characteristics preferably comprise exceeding a pre-established threshold by a radio-electric parameter, preferably the received power.

The step of determining a scanning position comprises preferably estimating such position depending on a previous terminal position. Determining the scanning position can anyway be based also on more than one previous position, for a better accuracy.

Preferably, in case of terminal tracking, the scanning position is a future position and the previous position is the current terminal position. In handover operations, the scanning position can be a future terminal position or the current terminal position, and the previous position is typically a past terminal position.

The method preferably also comprises the step of determining the previous terminal position. Such previous position is preferably determined depending on the result of a scanning performed in the previous position.

Before the terminal performs the scanning in the provided scanning position, the method preferably comprises the further step of communicating the above set of channels to the terminal. Moreover, the method can comprise the step of comparing the above set of channels, defining a first set of channels, with a second set of channels determined next to a terminal position before the scanning position, in which case the step of communicating said set of channels is performed only when the first set is different from the second set. In practice, the scanning would be repeated on the same set of channels on which it has been performed the last time.

Determining the set of channels received in the scanning position is preferably performed by a network server. In order to determine the set of channels received in the scanning position, it is possible to define, in the coverage area, a grid of points associated with respective sets of channels with pre-established reception characteristics, and then associate to the scanning position at least one grid point chosen according to a neighbourhood criterion. Alternatively, for determining the set of channels received in the scanning position, it is possible to compute the received powers in the scanning position on all available channels in the coverage area and determine which among such powers are greater than a preset threshold.

According to a second aspect thereof, the present invention relates to a method for providing a telecommunications service for a mobile terminal, comprising the steps of updating an information contents of the service depending on the terminal position within a pre-established area and periodically performing a scanning of transmission channels through the terminal to allow determining such position, such scanning being optimised according to the previously-described method.

According to a third aspect thereof, the present invention relates to a method for the handover of a mobile terminal in a telecommunication network, comprising the step of performing, through the terminal, a scanning of transmission channels for choosing a channel on which signals must be received and/or transmitted, said scanning being optimised according to the previously-described method.

According to a further aspect thereof, the present invention deals with a telecommunication network for mobile terminals, comprising:
a plurality of network access points defining a coverage area of such network, each access point being associated with a respective transmission channel;
at least one mobile terminal, adapted to move within a coverage area and configured for performing a scanning of transmission channels;
a server for locating the terminals, configured for determining a position in which the terminal must perform the scanning, for determining a set of channels adapted to be received in such position with predetermined transmission characteristics and for communicating such set of channels to the mobile terminal.

The server for locating the terminals is moreover preferably configured for determining the current terminal position depending on the scanning result of channels already performed by the terminal itself. The network moreover advantageously comprises an application server, integrated or not with the locating server, configured for providing the terminal with a service with information contents linked with its current position.

The technique of the present invention provides numerous advantages.

First of all, such technique allows increasing the connection throughput between Access Points and terminals with respect to the case in which the scanning is performed on all available channels, in addition to guarantee a better quality of offered services.

Such technique can moreover be associated with any application based on tracking since it does not pose any constraint on the rate with which a terminal must perform the channels scanning, but lets the application itself, and in particular the tracking server, decide its rate.

The technique of the present invention can moreover be used with any handover algorithm since it does not pose any constraint either on parameters or on modes used for deciding a handover or on parameters and modes used for locating the new Access Point through which to communicate.

The technique of the present invention can moreover be used with any WLAN network technology (IEEE 802.11 in all its versions, HIPERLAN, etc.) since it exclusively aims, as will be seen below, to determine the channels on which the terminal will have to perform the following scanning, both the one used as location and the one usable for handover purposes, and possibly the Access Points identifiers that will be received, and therefore makes no use of specific functionalities of a standard with respect to another.

Moreover, the present technique does not imply any modification to already developed standards and already deployed apparatuses since communications between tracking server and terminal occur by using normal communication protocols (such as for example TCP/IP) currently used by WLAN themselves.

The technique of the present invention can therefore be used with all WLAN user terminals and apparatuses currently on the market since locating is performed depending on received power measures on signals transmitted by Access Points; realising such measures does not require any additional functionality, since they are currently used also for other purposes linked to normal operation (for example, association, roaming, etc.).

Finally, the present technique allows the terminal to detect the presence of all Access Points being present in its own coverage range, independently from their position and their role in communications (serving Access Points or not) and therefore, since the error performed when locating depends on the number of detected Access Points, the locating accuracy is not affected.

BRIEF DESCRIPTION OF THE DRAWING

The present invention will be described below, in a preferred embodiment thereof, with reference to the enclosed drawings, in which:

FIG. 1 schematically shows a telecommunications network according to the present invention;

DETAILED DESCRIPTION OF THE INVENTION

Figure 2A:
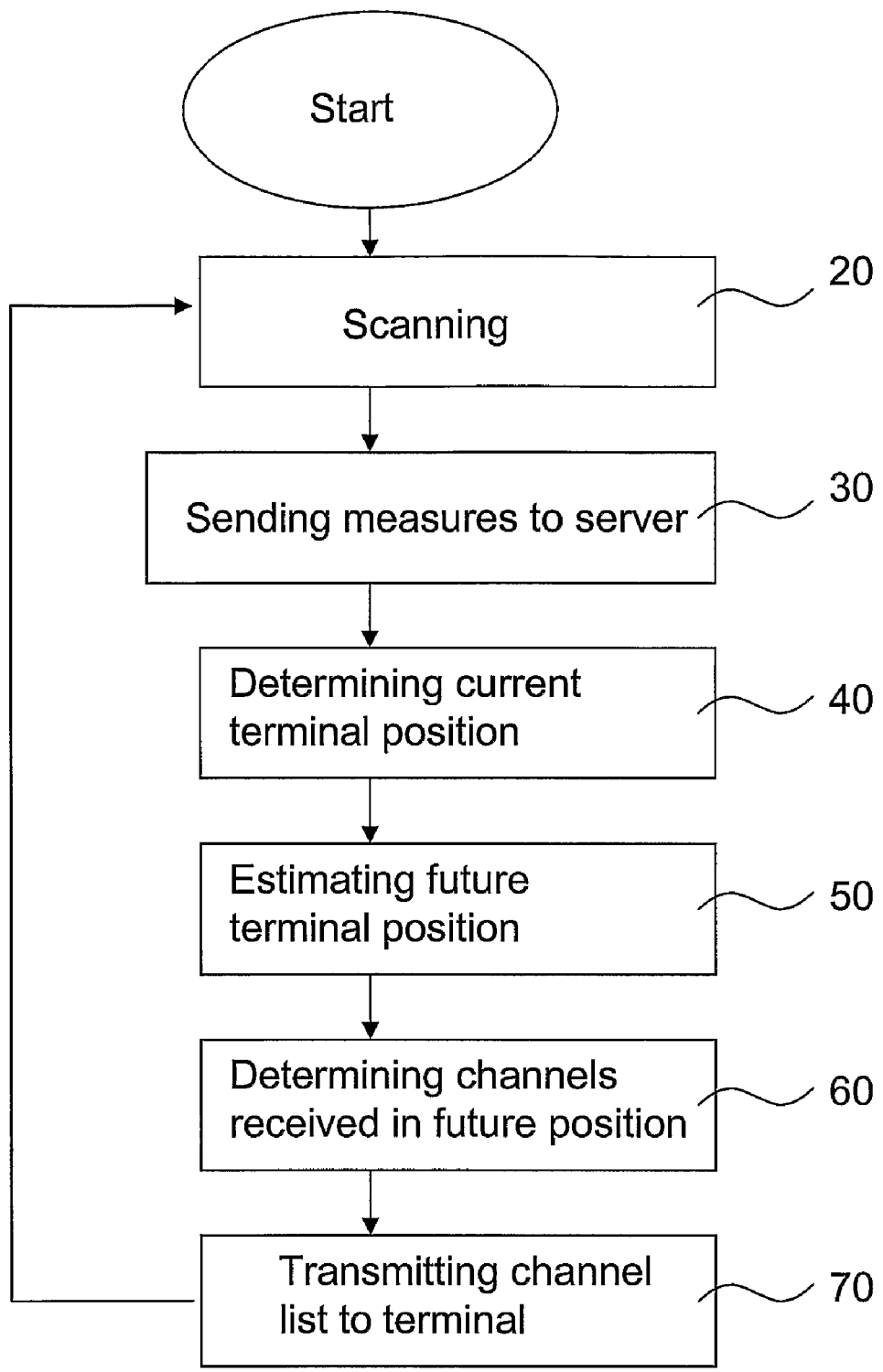
FIGS. 2a, 2b, 3a, 3b, 4a, 4b and 4c show flow diagram related to the different steps of the method of the present invention.

With reference to FIG. 1, 1 designates, as a whole, a Wireless LAN 1 network adapted to provide a series of telecommunications services to some users.

Network 1 comprises a set of Access Points 2, each one of which is equipped with an integrated antenna 3, or a non-integrated antenna 5 connected to the Access Points through a cable 4 of a suitable length. Network 1 further comprises user devices 8 adapted to be used by users to exploit the telecommunications services made available by the network. User devices are mobile terminals 8, such as for example PC desktops, laptops or PDA, equipped with a wireless apparatus 9, such as for example a card of the PCMCIA type or an adapter of the PCI type, integrated or not in the terminal 8 itself. Communications occur via radio (the radio means being designated with 10) through a standardised protocol, such as for example the IEEE 802.11 protocol or the HIPERLAN Type 2 protocol, or a proprietary protocol. Each Access Point 2 realises a respective radio coverage cell 6 inside the affected area and is connected to a wired network 11 through a suitable link 7. By using the wired network 11, the users can access to all services available for them.

Network 1 further comprises a server 12 for tracking the terminals 8. The server 12 is adapted to periodically locate the terminals, particularly to determine, at regular intervals, the position of a terminal 8 depending on measures performed by the terminal 8 itself on signals transmitted by Access Points 2. From the functional point of view, therefore, the tracking server 12 has two modules available, mutually communicating, whose purpose is executing the operations provided by the present invention. A first module, designated with 12a, contains the locating algorithm, namely the algorithm responsible for computing the current terminal position; a second module, designated with 12b, instead contains the algorithm responsible for executing further steps of the method of the present invention, described below. Such modules are preferably composed of two programs written in a suitable programming language, such as for example C or C++. From the physical point of view, the server 12 is represented by a Personal Computer or a Workstation equipped with a hard disk on which the above programs are stored, a processor responsible for executing such programs, a monitor and a keyboard through which the operator that manages such server 12 can configure possible parameters and quantities provided by the above programs. Moreover, the hardware elements, particularly the hard disk and the processor, can be duplicated in order to provide an operating warranty also in case of failures.

To be able to locate the terminals, the network 1 comprises a data base 13, integrated in the server 12 or, as shown in FIG. 1, connected thereto through a link 14, in which necessary information for locating the terminals, and therefore the users, are stored. Such information, according to the location algorithm being used, can comprise the position of Access Points 2, their radio-electric parameters (such as transmit power, antenna gain, radiation patterns, etc.), the environmental characteristics in which the network is realised (such as arrangement of walls, doors, etc., and their electro-magnetic characteristics, for example attenuation and reflection coefficients) and the signatures, namely a map that associates predetermined space positions belonging to the network coverage area to one or more parameters, measured or suitably computed, of the signal transmitted from Access Points. A part of the database 13 is moreover dedicated to storing the past terminal positions.

The network 1 comprises one or more application servers 15 which provide the user with real services and contents. These application servers 15 periodically receive from the tracking server 12 the position of users to which they are offering services in order to be able to update in real time the contents depending on received positions. Communications between two servers can use normal communication protocols such as TCP/IP, ATM or Frame Relay. The present invention is independent from type, format, sequence of messages that the two servers exchange and their related timing. For example the application server 15 could start the tracking of a mobile terminal 8 by sending the tracking server 12 a message containing the request of locating the mobile terminal 8 to be performed with prefixed periodicity, for example equal to 10 seconds. Under such situation, therefore, the tracking server 12 would send the application server 15, every 10 seconds, a message containing the terminal position. Every information message can be followed by an acknowledgement message sent by the addressee of the information message to the sender in order to signal the correct reception of the information message itself. The invention moreover is independent from algorithms and techniques used by the application server 15 for determining the contents to be provided to the user depending on his position. As an example, the application server 15 contents could be divided into geographic macro-areas and therefore the user would be provided with area contents within which the position computed by the tracking server 12 falls.

The network 1 further preferably comprises a second database 16 in which user profiles are stored, namely the credentials of all users for accessing the network, such as for example username and password, subscribed services and characteristics of these services (for example, in terms of mean band, peak band, delays, applied fares, etc). This database can further also include user history in terms of type of used services, use times and expenses paid for each service.

The present invention is independent from the physical realisation and functionalities of the Access Points 2. These can indifferently be bridges or routers with dynamic or static routing tables. If they are routers, they can use public or private IP addresses and therefore have NAT and PAT functionalities; as regards the safety aspects, they can use WEP safety mechanisms, even if it is, preferable that they implement stronger mechanisms provided by IEEE 802.1x or IEEE 802.11i standards; always with reference to safety, they can support VPN IP and can include or not fire-wall functionalities. The Access Points 2 module that realises protocols for the radio part (level 1 and level 2 of the ISO/OSI protocol stack) can be integrated in the Access Point 2 or can be composed of a PCMCIA or PCI card inserted in a suitable slot. The Access Points 2 can have a single radio module or can have two of them, not necessarily complying with the same standard and operating in the same frequency band; with these two radio modules, two overlapped cells can also be realised, even with different sizes, or it is possible to mutually connect the Access Points and then with the wire network (this connection mode is called "wireless backhauling").

The present invention is independent from the physical network 11 realisation: this can be composed of a local or standalone network (namely not interconnected to any other network) or it can be composed of the set of a local network and a geographic network mutually interconnected through suitable devices, such as bridges, switches or routers. Moreover the invention is independent from the technology with which the network 11 is realised: this can be in optical fibre, coaxial cable or copper pair with two or four pairs; it can be based on protocols of the IEEE 802 family, such as for example Ethernet, Token Ring, FDDI, etc. Protocols and/or TCP/IP, ATM and Frame Relay networking protocols, The network 11 can finally be a radio network realised through "Point-to-Point apparatuses PDH or SDH, Point-to-Multi-Point proprietary or standardised apparatuses, such as for example those with HIPERACCESS or IEEE 802.16 standard in its different versions and based on ATM or IP transport. It can finally be composed of Point-to-Point radio apparatuses of the wireless optics type.

The same statements are valid for links 7 connecting the Access Points to the network 11.

The tracking server 12 position can be anything: in particular, the server 12 can be placed locally, namely directly in the area in which the service must be provided, or can be placed in a remote service centre for providing the service in many areas simultaneously. The database 13, when it is not integrated in the tracking server 12, can be placed in its immediate neighbourhood, both locally and remotely, or can be placed in a different point of the network. In both cases, the links 14 connecting the server 12 with the database 13 can be a dedicated point-to-point link, or can be a logic link part of a local network or part of a geographic network. Communications between server 12 and database 13 use normal communications protocols such as TCP/IP, ATM or Frame Relay.

Also the application server 15 position can be anything: in particular, the server 15 can be placed locally, namely directly in the area in which the service must be provided, or it can be placed in a remote service centre for providing the service in many areas simultaneously. The application server 15 can be placed or not in the same network point of the tracking server 12. Finally, the application server 15 can be integrated in the tracking server 12. For simplicity, unless explicitly stated, herein below it will be assumed that the application server 15 is integrated in the tracking server 12 and reference will always be made to this latter one.

In the same way, the database 16 containing the user profiles can be placed locally or can be placed in a remote service centre. Such database 16 can finally be integrated with the application server 15 or the tracking server 12.

Moreover, the operator that provides the services based on position, and that therefore manages the application server 15, the operator that manages the tracking server 12, the operator (or operators) that manage the network 11 and the operator that manages the WLAN network 1 (in particular Access Points 12 and links 7) can be mutually different.

On each mobile terminal 8, there is a software module adapted to order the wireless apparatus 9 being present on the terminal itself to perform the channel scanning. This software module also communicates with the tracking server 12 through one of the common communication protocols, such as for example the TCP/IP protocol, always using the WLAN network. When a user performs the request of a service or an application that requires the user tracking, the tracking server 12 and the software module being present on the user mobile terminal 8 perform a bi-directional communication using the above-mentioned communication protocols. Through this connection, the tracking server 12 communicates to the software module the periodicity with which the wireless apparatus 9 must perform the channel scanning, while, always through this connection, the software module sends the tracking server 12 the performed measures during scanning. It is further possible that the periodicity with which the scanning has to be performed is decided by the mobile terminal 8 due for example to some hardware constraint thereof. In this case, the tracking server 12 can deduce this periodicity, if it has not been explicitly informed by the software module, for example by measuring the time distance that passes between the first two messages containing the results of the first two scannings.

For the purposes of the present invention, it does not matter which procedure is used by the software module, the tracking server 12 and the application server 15 both for starting and for ending the tracking, as well as it does not matter that the user explicitly knows that he is subjected to a location procedure or have provided his consent or not. For example, the start of a tracking procedure can be performed by the application server 15 when the user requests a service based on tracking, as already previously stated, or it can be automatically starter by the mobile terminal 8 upon its turning on or upon entry in the network. The tracking conclusion, instead, can occur upon turning off the mobile terminal 8, when the mobile terminal 8 goes out of the coverage area of the Access Points 2, upon closing the service or the application required by the user or finally when it is found that the service/application contents do not correspond with those provided in the user service profile, particularly as regards the fares associated therewith.

Since the technique of the present invention, described below, allows improving the service quality offered to a user, it is possible that the application server 15 or the tracking server 12 query the database 16, before starting the mobile terminal 8 tracking, in order to verify the user service profile that owns the terminal to be located and then decide whether to apply the scanning optimisation technique described below. Such technique, in fact, could be applied to users that requested the service/application with a high-quality attribute, particularly in terms of band and delay, and that therefore pay suitable fares, and not to users that subscribed the same service but with low quality. Alternatively the distinction could be performed among users belonging to companies, and that therefore has a service profile of the "business" type, and individual users with service profile of the "residential" type. Alternatively the scanning optimisation could be applied to the most "faithful" users, namely to users that exceeded a certain use threshold of service based on location in terms of time or in terms of paid expenses.

Briefly, the method of the present invention provides that, when a user enters an area in which services are present that required the terminal 8 tracking, the tracking server 12 instructs the terminal 8, and in particular the software module installed thereon that interacts with the wireless apparatus 9, to periodically perform the scanning of frequencies and the measures which the server 12 needs for estimating its position, Such measures, once performed, are sent, with the same periodicity, to the server 12, which is thereby able to determine the terminal 8 position. Depending on the knowledge of the current terminal 8 position, the application server 15 can update those information to be transmitted to the terminal itself.

Herein below, some techniques are described that can be used by the tracking server 12 to estimate the current position of a un mobile terminal 8 depending on the measures received therefrom, The present invention is independent from the use of past positions, stored in the database 13, for determining the current positions. For example, the current position can be directly obtained by applying the techniques described below or can be obtained as arithmetic mean between the position obtained with the techniques described below and the position obtained by combining the position of the previous step and the movement rate estimated depending on n previous positions (parameter n is configured by the system administrator during set-up). For easiness, herein below it will always be assumed that the current position is directly obtained by applying one of the below-described location techniques.

A first location technique is based on computed signatures. According to such technique, the estimation of the current position can be performed using the technique disclosed in WO00/50918, that provides for the comparison among the measures performed by terminal 8 and a set of computed signatures. The computation of these signatures is performed as mentioned below: in the whole area in which the service has to be offered, a grid of points is located, identified for example by Cartesian coordinates (x, y) with respect to a known reference, and in each one of such points, the powers received on signals transmitted from different Access Points 2 are computed. Since wireless apparatuses 9 that can be found on the market are not able to receive too low signals (typically less than −90 dBm), the tracking server 12 discards the received powers that from computation should result less than a pre-established threshold, fixed by the system administrator (for example −100 dBm, to be on the safe side); every point and the related computed powers compose a signature. The computation of received powers can be performed through propagation models, for example the one describing the propagation in a free space. According to this model, the power Pi received by the i-th Access Point is given by the following formula:

$$P_i = \frac{P_{ti} G_{ti} G_r c^2}{d_i^2 f_i^2 (4\pi)^2} \qquad (1)$$

where $P_{ti}$ is the transmission power of the i-th Access Point, $G_{ti}$ is the transmission antenna gain of the i-th Access Point, $G_r$ is the reception antenna gain, $d_i$ is the distance between the point and the i-th Access Point, c is the rate of light in vacuum and $f_i$ is the frequency on which the i-th Access Point transmits. In indoor environments, such model can be modified in different ways as shown for example in book "Wireless Communications—Principles and Practice", Theodore S. Rappaport, Prentice Hall PTR, New Jersey, 1996, pages 70-73 and 122-133. The comparison between measures performed by terminal and computed signatures can be performed by using one among the different, commonly known error functions: for example, a possible function is composed by the mean square error between power measured by terminal to be located and power computed in each signature (in a formula $$\text{Error} = \sum_{i=1}^{n} (P_i^{meas} - P_i^{calc})^2$$

where $P^{meas}$ and $P^{calc}$ are respectively the measured and computed power on signals received by i-th Access Point). The point in which the current terminal position is estimated is the one minimising such mean square error. The above-described location technique requires the knowledge of Access Points 2 position and their radio-electric parameters, namely transmission powers, antenna gains and transmitting radiation diagrams, and transmission frequencies.

A second location technique is based on measured signatures. This technique, disclosed in WO00/50918 and in WO02/054813, provides that the current mobile terminal 8 position is obtained by comparing the measures performed by terminal 8 to be located and a set of measured signatures in a preliminary step and stored in the database 13. The measure of these signatures is performed through an ad hoc mobile terminal equipped with a wireless apparatus similar to the one used by mobile terminals 8. This terminal, for each point of the area in which the signature has to be measured, identified by its Cartesian coordinates (x, y) with respect to a known reference, performs the scanning of all available channels and stores in the database 13, for each channel, the identifier of Access Points 2 being present thereon and the received power on signals transmitted by different Access Points 2. Also with this technique, the comparison between measures performed by terminal and measured signatures can be performed by using one among the different commonly-known error functions as already stated with respect to the technique based on computed signatures. What is interesting, for the purposes of the present invention, is that the database 13 stores information about results of the scanning performed by the ad hoc mobile terminal in the preliminary step.

A third location technique is based on multilateration. In practice, as an alternative to previous techniques, the server 12 can estimate the position of a terminal 8 using the known multilateration technique, obtained from satellite location systems such as the GPS, based on the computation of the distance between terminal 8 and Access Points 2; such computation is performed starting from the received power measured by terminal 8 on signals transmitted by the same Access Points 2. With this technique, the position of terminal 8 is the one minimising an error function, for example the mean square error, obtained from the differences between computed distances and real distances; in other words, given $x_i$, $y_i$ the coordinates of the i-th Access Point 2 and given $d_i$ the distance computed as stated above starting from the received power, the position (x, y) of terminal 8 is such that, with reference to the mean square error, minimises the following functions:

$$\text{Error} = \sum_{i=1}^{n} \left( \sqrt{(x_i - x)^2 + (y_i - y)^2} - d_i \right)^2 \quad (2)$$

where n is the number of measured Access Points 2. If n=3, multilateration becomes three-lateration and point (x, y) is the one that resets the Error function of the Equation 2 and corresponds to the intersection of the three circumferences having as center the position of Access Points 2 and as radius the computed distance $d_i$. The computation of distances $d_i$ between terminal 8 and Access Points 2 is performed by inverting the previously-described propagation model equation (Equation 1). Also this technique requires the knowledge of Access Points 2 position and their radio-electric parameters, namely transmit powers, antenna gains and transmit radiation diagrams, and transmission frequencies.

The tracking server 12, in addition to computing the terminal position through one of the three previous techniques, can also perform an estimation of the error associated with such position so that the current terminal position can be not a point but a circumference having its center in the computed position and its radius equal to the error. For the purposes of the present invention, the algorithm used by the tracking server for estimating the position-associated error is not relevant. For example, in case of techniques based on signatures, it could be given by the mean distance between the signature that minimises the error function and the n signatures that are nearest thereto. Instead, in case of techniques based on multilateration, it can be simply given by the radius of the cell inside which there is the terminal that is located.

FIG. 2a shows the operations performed in order to optimise the scanning by a terminal 8. In a first step (step 20), the terminal 8 performs the scanning on a set of channels established with the criterium described below (apart from the first scanning performed at the beginning of the procedure, that is performed on all available channels).

The result of such measure is sent from terminal 8 to server 12 (step 30). Such measures contain, in particular, the identifier of Access Points 2 being present on channels in which the scanning has been performed and the measures of received power on signals transmitted by Access Points 2 themselves. After having received such measures, the server 12 estimates the current terminal 8 position by using one of the three previously-described location techniques (step 40). Using such position and past positions stored in the database 13, the server 12 determines the position in which it will be most likely to fine the terminal 8 in the following instant in which it will again have to perform the scanning (step 50) that, as previously stated, is performed with a known periodicity (for example on the order of a few seconds) both on the tracking server 12 and on the mobile terminal 8. Now, the server 12 obtains which are the Access Points 2 which the terminal 8 will be able to receive in the scanning position computed in step 40 and locates the channels (and therefore the related frequencies) on which such Access Points 2 operate (step 60). The server 12 communicates this set of channels to the terminal 8 (step 70) for performing the following scanning and puts itself waiting for receiving new measures.

The above steps 20 to 70 are repeated upon reaching, by the terminal, the scanning position estimated in step 40. In practice, after having reached such position, the terminal 8, through its own software module, orders its own wireless apparatus 9 to perform the scanning only on the set of channels received by the server 12, thereby reducing the global scanning times and consequently increasing the connection throughput.

The above steps (steps 20-70) are then cyclically repeated till the end of the tracking service.

Figure 2B:
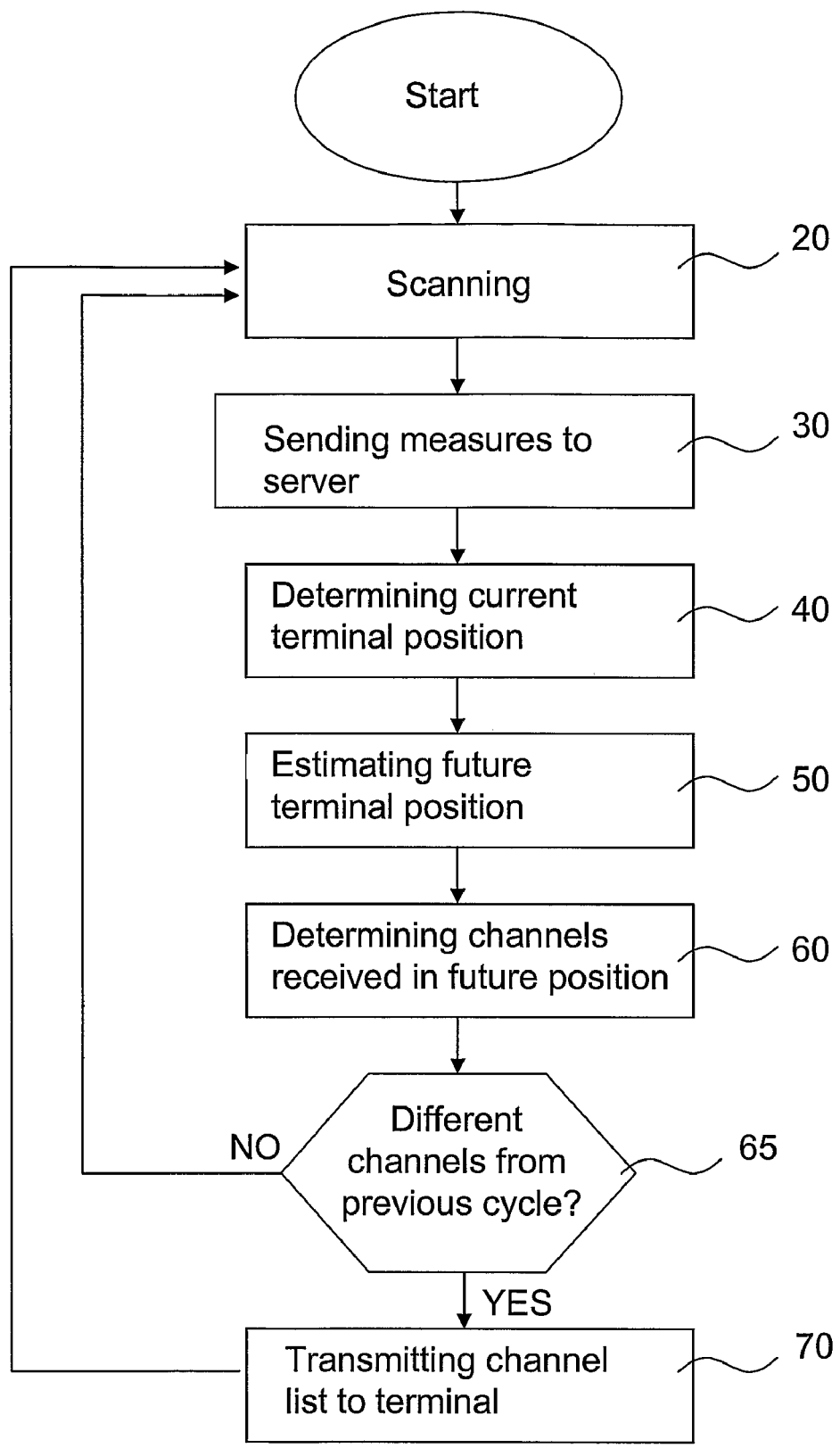

FIG. 2b discloses a variation of the above-described method in which steps 20 to 60 are identical to the previously-described steps, but, after step 60, the tracking server 12 verifies whether there are, among the located channels, different channels from those located in the previous cycle (step 65) and, only if the reply is affirmative, transmits the list of channels to terminal 8 (step 70). The behaviour of terminal 8 is similar to the one kept in the previous case with the only difference that, if it does not receive any indication about channels by the server 12, the scanning is performed by the same channels of the previous cycle.

For the purposes of the present invention, it does not matter which specific technique is implemented by the tracking server 12 for determining the terminal 8 position in the instant in which it will have to perform the following scanning (step 50). This operation can be performed starting from the current position and taking into account rate and movement direction of terminal 8. These latter ones can be instantaneous, namely obtained by taking into account current position and previous position, or average, namely obtained by taking into account current position and a certain number of previous positions. Such options are configured by the system administrator during set up. Alternatively it is possible to use more sophisticated techniques, such as those based on Kalman filters, on neural networks, etc, that make use of current position and a certain number of previous positions. Moreover, if the operation of estimating the future position comprises a known error, the future position will not be a single point but an area. Assuming for example that the server 12 performs an estimation of the movement rate by performing the average on the last n positions, the error made by the server on it can be computed for example by the difference between this average rate and the estimated rate between the last location and the current location. Applying the known laws of physics; the future position will not be a point but a segment along the moving direction and centred on the point obtained from the average rate. Similar considerations are also valid for the movement direction and for the other quantities possibly used by the specific algorithm; the same statement is also valid if the current position of the mobile terminal is not a point but is also an area (in particular a circumference).

The operation of determining the received channels in the future position of terminal 8 (step 60) can be performed according to one of the three following techniques, depending on the type of location technique used by the tracking system 12 and described previously.

Figure 3A:
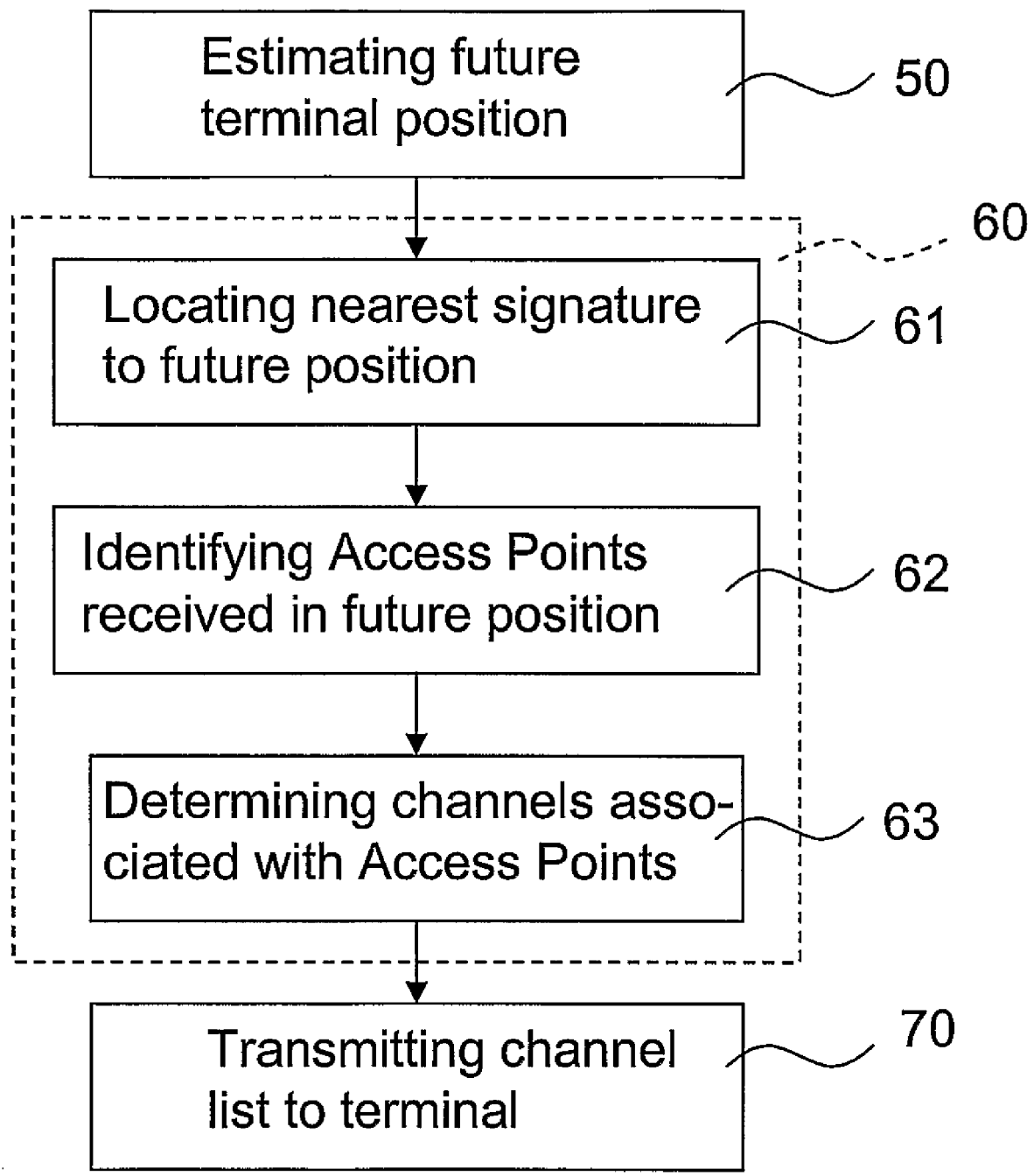

A first technique for determining the channels is associated with the location technique through computed signatures. Such technique, described with reference to the flow diagram in FIG. 3a, has to be used if the tracking server makes use of the location technique based on computed signatures and previously described in its general principles. In practice, the server 12, after having estimated the position in which the terminal 8 will be in the following cycle (step 50), located the geographically nearest signature to such position (step 61). The server 2 then identifies the received Access Points 2 in the signature, assuming that they are really the Access Points 2 received in the future position (step 62). From the identifier of these Access Points, the server 12, through the database 13, goes back to the frequencies in which they operate (step 63). These frequencies correspond to the channels in which the terminal 8 must perform the scanning and are therefore sent by the server 12 to the terminal 8 (step 70).

A second channel-determining technique is associated with the location technique through measured signatures. Such technique, to be used if the tracking server makes use of the location technique bases on measured signatures, is also described by the sequence of steps in FIG. 3a and is different from the previous technique since, after the server 12 has located the geographically nearest signature to the future terminal position (step 50), the server 12 itself locates, through data contained in the database 13, on which channels the signature-collecting terminal has detected, next to such signature, the presence of at least one Access Point. It will then be assumed that the Access Points associated with such channels correspond to the Access Points received in the future position. The list of such channels, on which the scanning has to be performed, is then sent to the terminal (step 70).

A possible variation to the two above-described techniques (that make use of the location through signatures) can be selecting, in step 61, instead of a single signature, a group of nearest signatures to the position determined in step 50 and assume that all Access Points 2 that are present in the signatures will be received also in the estimated position (step 62). The number of signatures to be used can be fixed and configured by the system administrator during set-up, or can be variable taking into account the signatures that can be found within a certain distance, also this configured by the system administrator, from the located position. If the position determined in step 50 is an area, the tracking server 12 will select all signatures that are geographically placed within this area (step 61) and will assume that all Access Points 2 being present in the signatures will be received also in the estimated position (step 62).

Figure 3B:
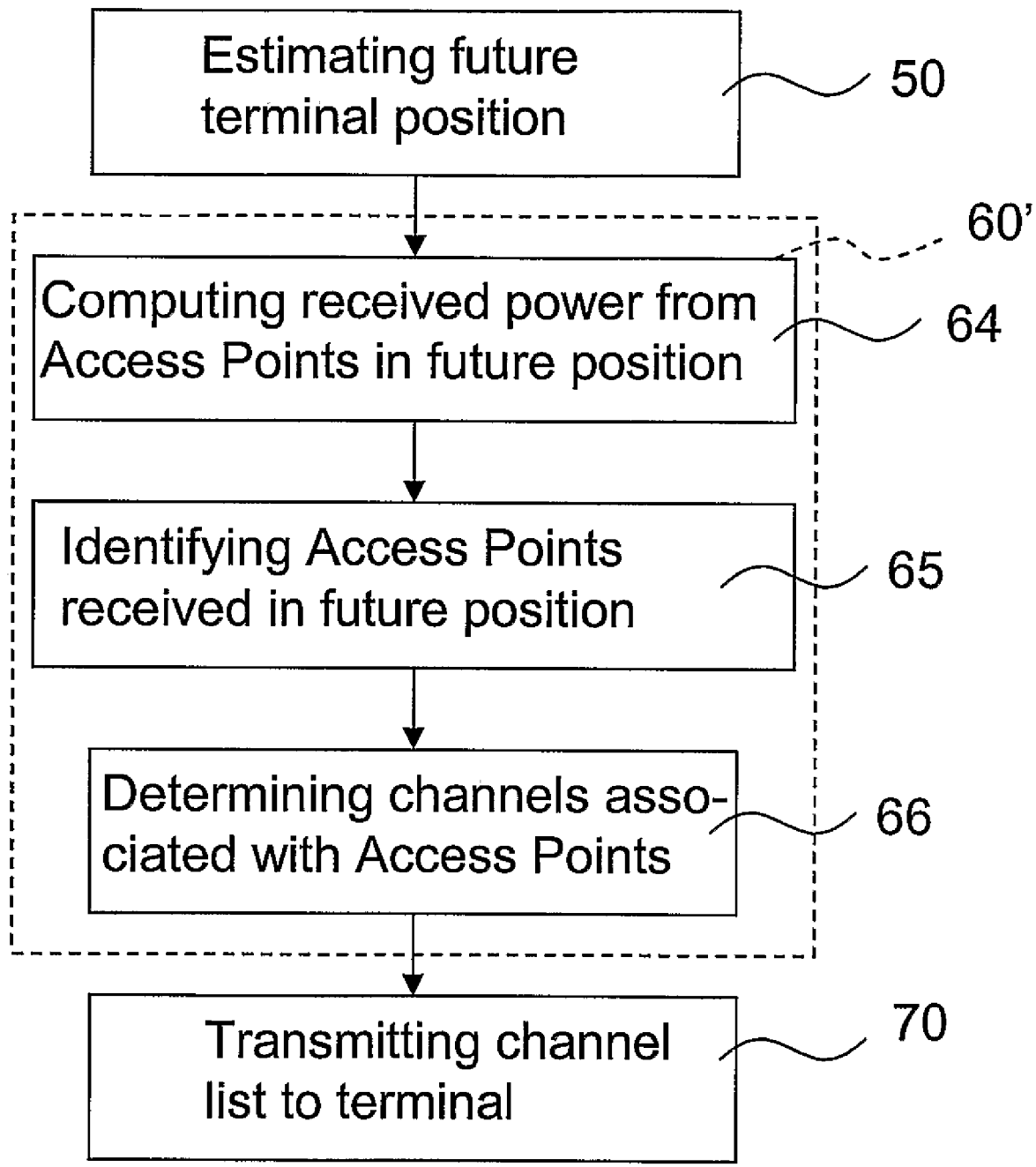

A third channel-determining technique is associated with the location technique through multilateration. Such technique, described with reference to the flow diagram in FIG. 3b and designated there with 60', has to be used in case the tracking server makes use of the location technique based on multilateration and also described previously in its general principles. In practice, the server 12, after having estimated the position in which the terminal 8 will be in its following cycle (step 50), compute the received power in the point located on the signals transmitted from all Access Points 2 (step 64); such computation is performed by using the same propagation models used in position-estimating operations in step 40. The server 12 assumes that in such position all Access Points 2 will be received for which the thereby-computed power is greater than a predefined threshold value fixed by the system administrator during set-up (step 65); such threshold value represents the minimum power value that can be received by a commercial wireless apparatus 9 and below which the Access Point is not detected. From the identifier of these Access Points 2, the server 12, through the database 13, goes back to the frequencies in which they operate (step 66). These frequencies correspond to the channels on which the terminal 8 must perform the scanning and are then sent from server 12 to terminal 8 in step 60. If the position determined in step 50 is an area, the tracking server 12 will compute the received power in all area points on signals transmitted by all Access Points 2 (step 64) and will assume that in such area all Access Points 2 will be received for which the thereby-computed power is greater than the predefined threshold value in at least one area point (step 65).

If the terminal 8 has a constraint on the maximum number of Access Points 2 that can be measured or the server 12 has a constraint on the maximum number of Access Points 2 that can be used by the location algorithm, the server 12 can select, among all Access Points 2, a subset thereof depending on their distance with respect to the point located in step 40 (for example the server 12 selects the nearest Access Points 2) or depending on the received power in the point (for example the server 12 selects the most powerful Access Points 2) or depending on geometric characteristics of the figure formed by the Access Points 2 themselves (for example the server 12 discards an Access Point 2 if it is placed in the same position as of another). The number of Access Points 2 of this subset and the reference parameter (distance, received power and geometry) are configured by the system administrator during set-up.

As previously described, the scanning operations are performed also when a terminal must perform the handover for changing the reference Access Points.

Figure 4A:
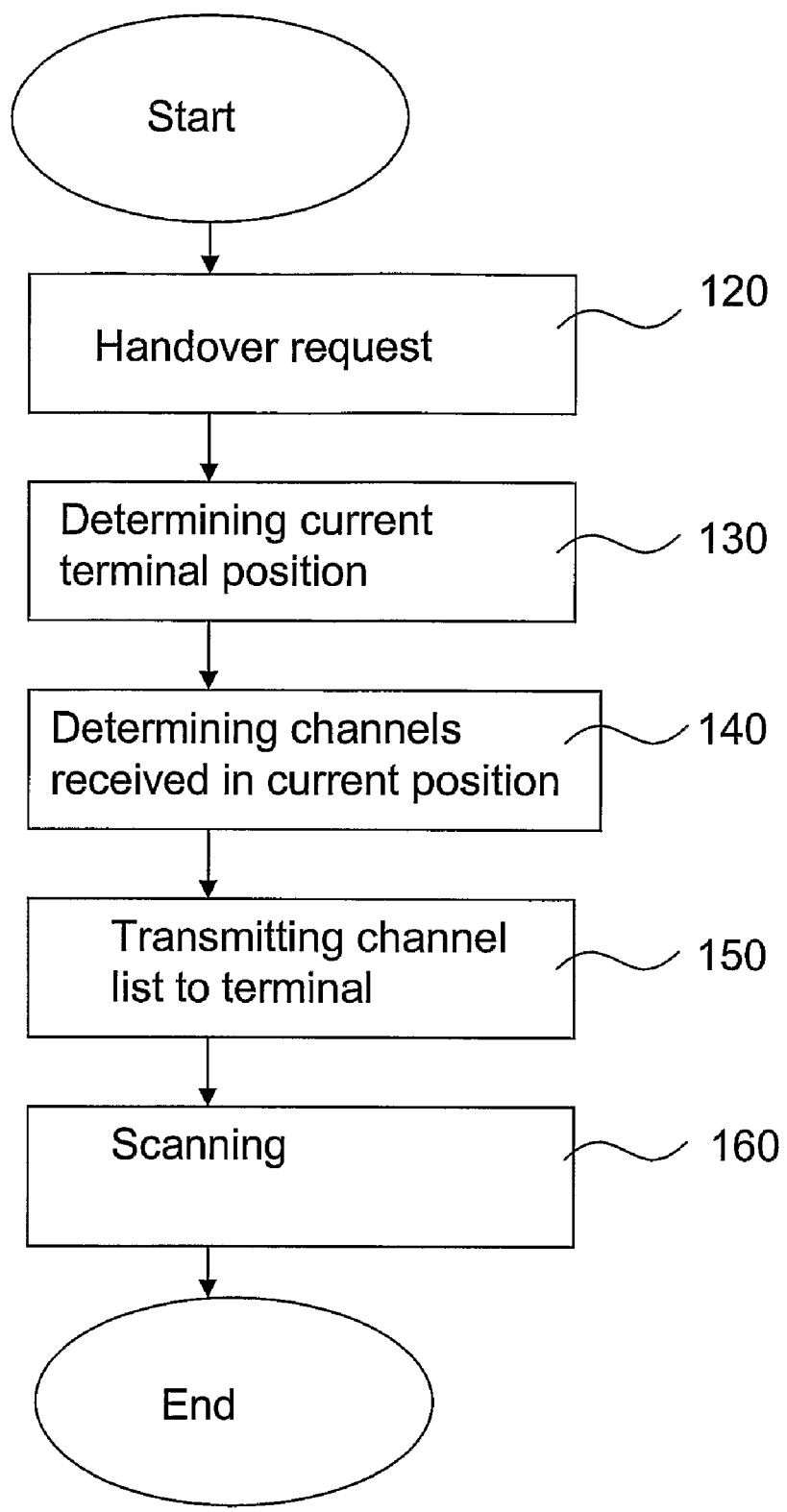

FIG. 4a shows the operations that the tracking server 12 performs in order to optimise the scanning for handover by the terminal. In step 120, the tracking server receives from the terminal a message (handover request) with which the terminal communicates the need of performing a handover. After having received such message, the server 12 estimates the current terminal position depending on the last measured terminal position and the time passed from such last location (step 130). Now the server 12 obtains which are the Access Points that the terminal is able to receive in the position obtained in step 130 and locates the channels on which these Access Points operate (step 140). The server communicates this set of channels to the terminal (step 150).

The terminal, and in particular the software module installed thereon, after having received from the tracking server 12 the list of such channels, performs the scanning only on these channels thereby reducing the times and consequently improving the quality of services (step 160).

Figure 4B:
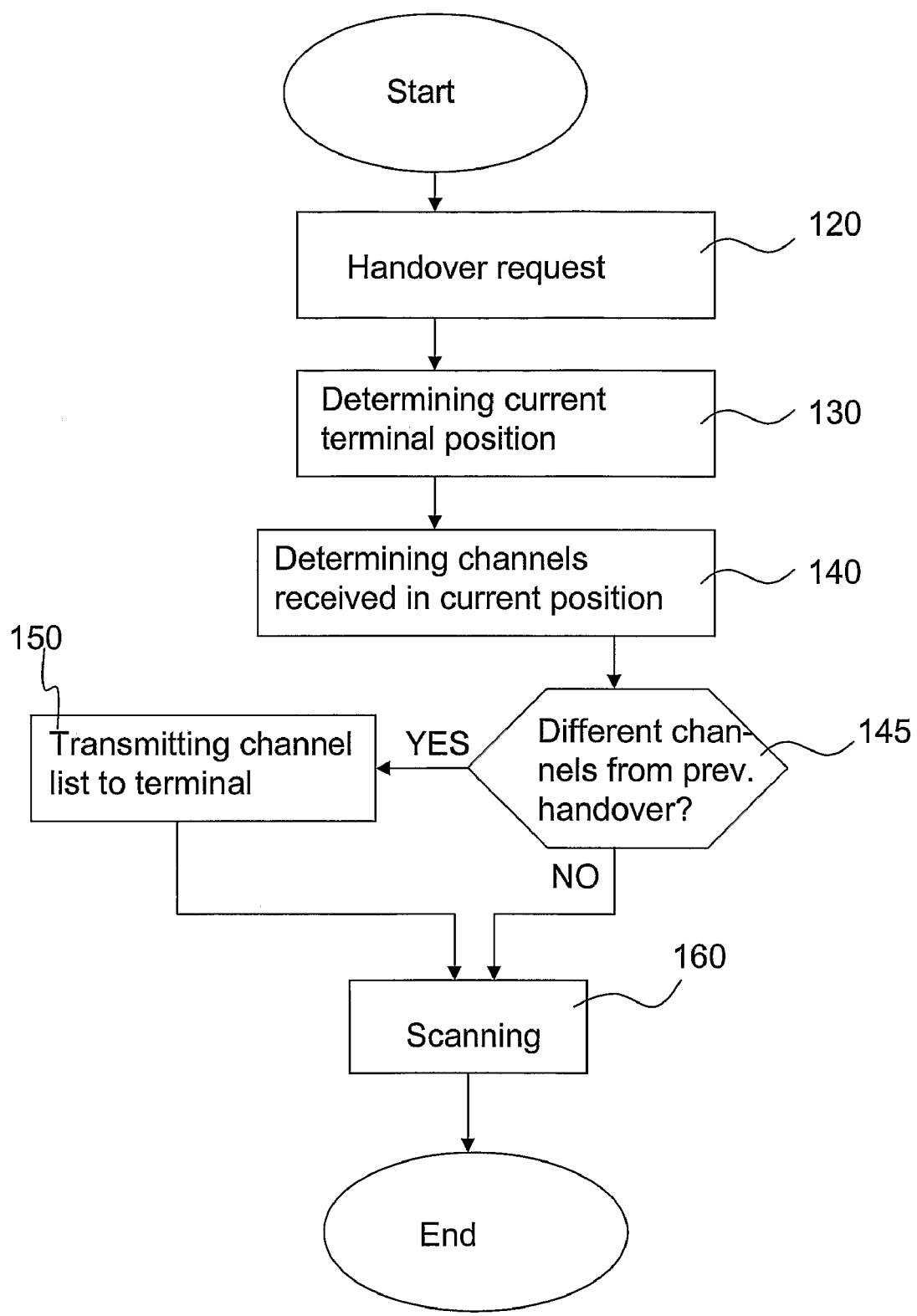

FIG. 4b shows a variation of the above-described method in which, after step 140, the tracking server verifies whether the located channels are different from those located by the previous handover (step 145). If the reply is affirmative, the server communicates the set of located channels to the terminal (step 150). Otherwise, there is no communication from server to terminal. The terminal then performs the scanning (step 160) on the list of channels received by the server or, if it does not receive any indication about the channels from the server, on the same channels of the previous handover.

The terminal position when the server receives the handover request can be obtained by the tracking server (step 130) knowing the last terminal position, the time interval passed since the last location and taking into account rate and movement direction of the terminal. These latter ones can be instantaneous, or obtained by taking into account the last position and the previous position, or average, namely obtained taking into account the last position and a certain number of previous positions. Such options are configured by the system administrator during set up. Alternatively it is possible to use more sophisticated techniques, such as those based on Kalman filters, on neural networks, etc., that make use of the last position and of a certain number of previous positions. Moreover, as already previously stated, if the last position and/or the previous positions comprise a known error, the position obtained in step 130 will not be a single point but an area.

The operation pointed out in step 140, namely determining the received channels in the terminal 8 position determined in step 130, can be performed according to one of the three previously-described modes depending on the type of location technique used by the tracking system.

It must be underlined that the present invention can be realised with any algorithm useful to establish the need of an handover. Herein below, three possible algorithms are disclosed, that are commonly implemented by the apparatuses and can be used with the present invention.

A first algorithm is based on the measure of the received signal: the terminal decides to perform a handover when the signal received by its own Access Point drops below a certain threshold that can be equal, for example, to the receiver sensitivity.

A second algorithm is based on the average value of the received signal; the terminal decides to perform a handover when the average value of the signal received by its own Access Point (this average is performed on a predefined time window) drops below a determined threshold that can be equal, for example, to the receiver sensitivity.

A third algorithm is based on lost packets: the terminal decides to perform a handover when the number of packets received and discarded because wrong drops below a determined threshold (for example equal to 40% of wrong packets on the last 10 packets, or equal to 3 wrong consecutive packets).

The above-described algorithms can be used in combination with "rate switching" algorithms, namely with algorithms that make the terminal transmit at a lower transmit rate before deciding to perform a handover. For example, a rate switching algorithm combined with the first previously-described algorithm can be realised by defining many thresholds and making the handover performed when the signal exceeds the last threshold, namely the lowest threshold, while when it exceeds the previous ones, a simple transmit rate reduction is performed.

The present invention can further be realised whichever is the algorithm used by the terminal, at the end of scanning, to choose the Access Point through which communications are made. The terminal can in fact choose to communicate through the Access Point from which it receives the stronger signal or through any one among the Access Points from which the terminal receives a signal that is higher than a predefined threshold. Moreover, in order to be able to choose the Access Point depending on the average value of the received signal, the scanning can be repeated many times, or using the same list of channels received by the server or a subset thereof choosing the n channels on which the received signal is stronger or choosing those in which the received signal is greater than a predefined threshold.

Figure 4C:
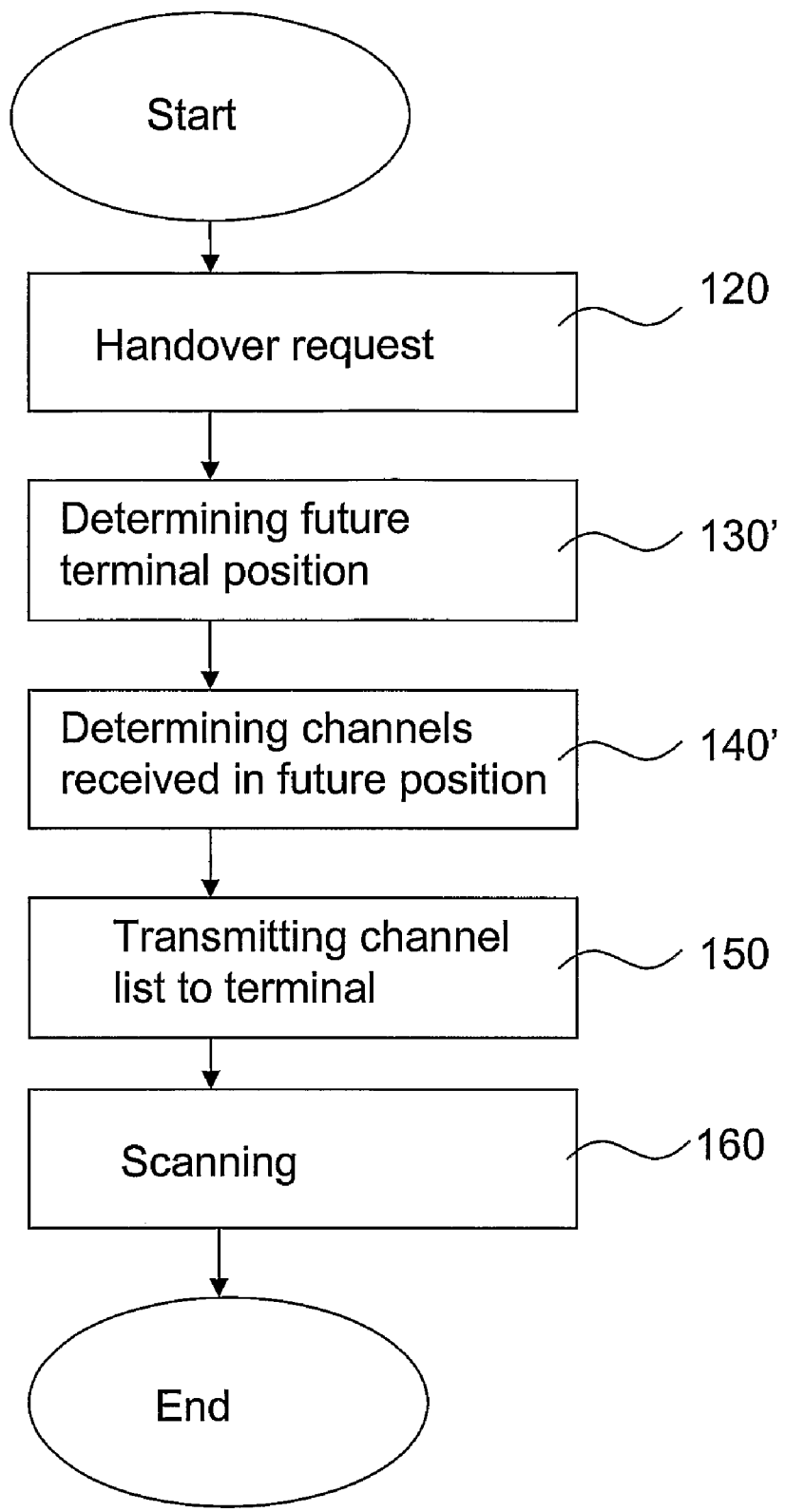

FIG. 4c instead shows a variation of the procedure in FIG. 4a. Also in this case, there is a handover request from the terminal 8, to be performed however after a time t from the request itself (and not immediately, like in the previous case). Now the server 12 estimates the terminal position in the instant in which this latter one will have to perform the handover using the value t and knowing the time passed from the last location (step 130'), and then obtains which are the Access Points that the terminal will be able to receive in such future scanning position and locates the channels on which these Access Points operate (step 140'). The server communicates this set of channels to the terminal (step 150) and the terminal performs the scanning on such channels (step 160).

The present invention can be realised with any useful algorithm to provide the need for an handover after a time interval t. For example, such algorithm can be based on the computation of the slope of curves used by previously-described algorithms to detect the need for an handover.

If the terminal has a constraint on the maximum number of Access Points that can be measured or if it is desired to further reduce the scanning length, the server can choose, among all Access Points, a subset thereof composed of those that allow receiving, in the position computed in step 130 or 130', the highest power, The number of Access Points of this subset is configured by the system administrator during set-up.

To the sequence of steps in FIG. 4c the variation described with reference to FIG. 4b can possibly be applied, such variation consisting in sending to the terminal the list of channels on which the scanning must be performed only if it is verified that such list is different from the one on which the terminal has performed its last scanning.

It is finally clear that numerous modifications and variations can be made to the method, the network and the apparatuses herein described and shown, without departing from the scope of the present invention.

For example, in the diagrams in FIGS. 2a, 2b, 4a, 4b, 4c, in the step of determining the channels received in the position in which the terminal must perform the scanning (steps 60, 60', 140, 140') also the identifiers of the Access Points 2 received in such position could be obtained, always through the previously-described modes. Such list can then be sent to the terminal 8 together with the channels (step 70, step 150). Due to such additional information, the terminal 8, when performing the scanning, instead of stopping on each channel for the maximum time fixed by the standard, can stop even only for the necessary time to measure the power on signals transmitted from Access Points 2 signalled thereto by the server 12, thereby further reducing the scanning length.

Moreover, as already previously stated, the scanning optimisation technique of the present invention can be applied to terminal tracking operations, to handover operations, or to both of them.

The invention claimed is:

1. A method for optimising the scanning of radio channels by a mobile terminal in a telecommunications network, comprising the steps of:
   a) determining, within a network coverage area, a scanning position in which the terminal must perform the scanning of radio channels;
   b) determining by a server a set of radio channels received in the scanning position with pre-established reception characteristics;

c) communicating by the server said set of channels to said terminal; and d) performing, in the scanning position, only the scanning of such set of channels;

wherein the step of determining a scanning position comprises evaluating said scanning position depending on a previous terminal position, and wherein steps a), b), c), and d) are either cyclically repeated or performed following a request from said terminal.

2. The method according to claim 1, wherein the step of performing the scanning comprises performing on each channel of said set the measure of at least one radio-electric parameter.

3. The method according to claim 1, wherein said pre-established reception characteristics comprise exceeding a pre-established threshold by at least one radio-electric parameter.

4. The method according to claim 2, wherein said radio-electric parameter is the received power.

5. The method according to claim 1, wherein said scanning position is a future terminal position and said previous position is the current terminal position.

6. The method according to claim 1, wherein said scanning position is a future terminal position and said previous position is a past terminal position.

7. The method according to claim 1, wherein said scanning position is the current terminal position and said previous position is a past terminal position.

8. The method according to claim 1, comprising the further step of determining said previous terminal position.

9. The method according to claim 8, wherein said previous position is determined depending on the result of a scanning performed in the previous position.

10. The method according to claim 1, further comprising a step of comparing said set of channels, defining a first set of channels, with a second set of channels determined at a terminal position before said scanning position, said step of communicating said set of channels being performed only when said first set is different from said second set.

11. The method according to claim 1, comprising a step of communicating to said terminal also the identifiers of network access points associated with said channels.

12. The method according to claim 1, wherein a step of determining a set of radio channels received in the scanning position with pre-established reception characteristics is performed in a server or said network.

13. The method according to claim 1, further comprising a step of defining, in said coverage area, a grid of points associated with respective sets of channels with pre-established reception characteristics, said step of determining a set of radio channels received in said scanning position with pre-established reception characteristics comprising associating with said scanning position at least one point of said grid chosen according to a neighbourhood criterion.

14. The method according to claim 1, wherein said step of determining a set of radio channels received in said scanning position with pre-established reception characteristics comprises computing the received powers in said scanning position on all available channels in said coverage area and determining which among said power are greater than a present threshold.

15. A method for providing a telecommunications service for a mobile terminal, comprising the steps of updating information contents of said service depending on the terminal position inside a pre-established area, and periodically performing a scanning of transmission channels through the terminal for determining said position, wherein said scanning is optimised according to the method of claim 1.

16. A method for the handover of a mobile terminal in a telecommunications network, comprising the step of performing, through the terminal, a scanning of transmission channels for choosing a channel on which signals are received and/or transmitted, wherein said scanning is optimised according to the method of claim 1.

17. A telecommunication network for mobile terminals, comprising:

a plurality of network access points defining a coverage area of said network, each access point being associated with a respective transmission channel;

at least one mobile terminal that moves within a coverage area and configured for performing a scanning of transmission channels; and a server for locating the terminals, configured to a) determine a scanning position in which the terminal must perform the scanning, b) determine a set of channels to be received in such position with predetermined transmission characteristics, c) communicate such set of channels to the mobile terminal, and d) perform, in the scanning position, only the scanning of such set of channels, wherein the step of determining a scanning position comprises evaluating said scanning position depending on a previous terminal position; and wherein steps a), b), c), and d) are either cyclically repeated or performed following a request from said terminal.

18. The telecommunications network according to claim 17, wherein the server for locating the terminals is configured also for determining the current terminal position depending on the result of a scanning of channels performed by the mobile terminal, the network further comprising an application server configured for providing a service with information contents related with the current position.

* * * * *